May 5, 1931.   G. R. BOTT   1,803,591
BEARING ASSEMBLY UNIT AND MOUNTING THEREFOR
Filed Dec. 29, 1927
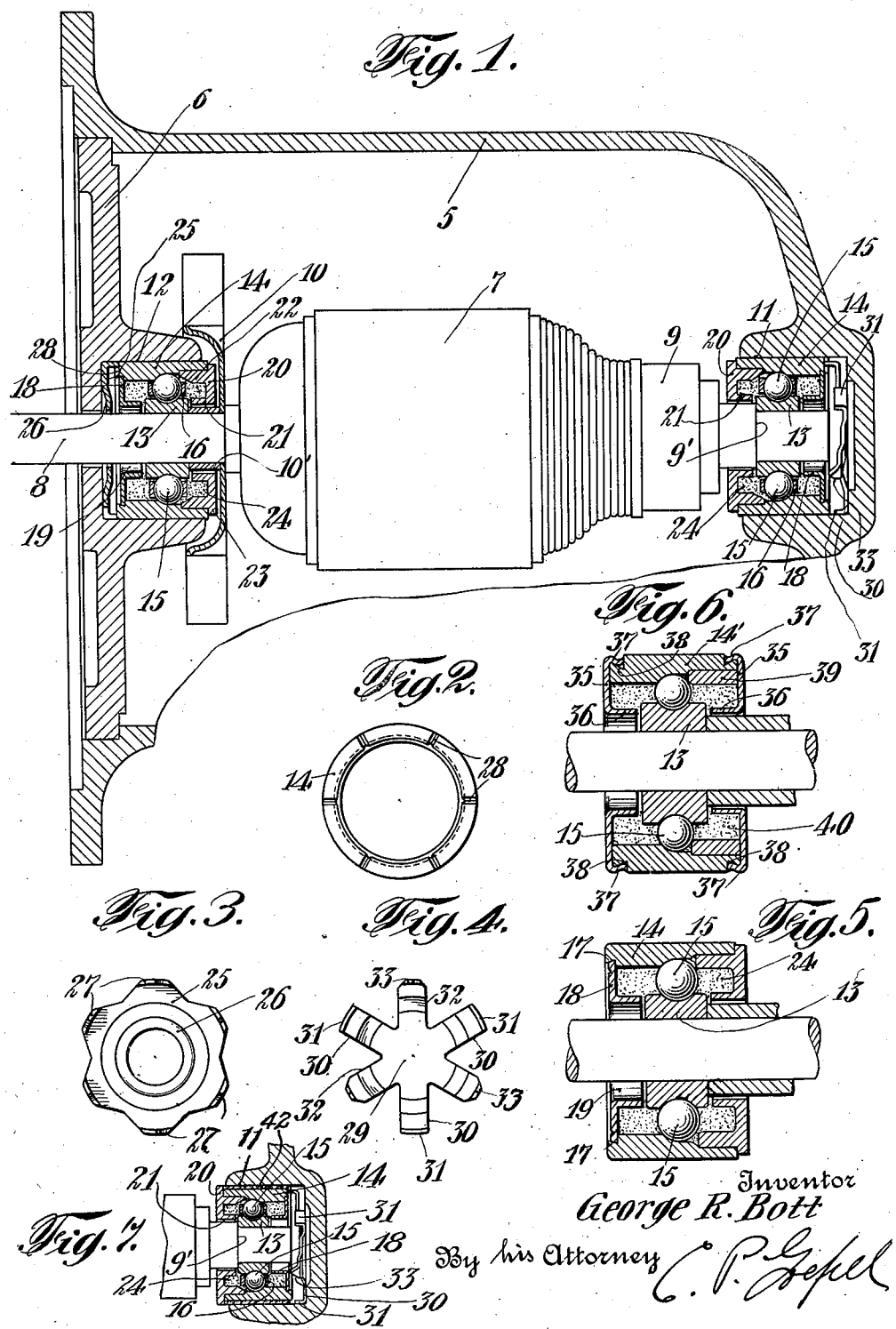

Patented May 5, 1931

1,803,591

UNITED STATES PATENT OFFICE

GEORGE R. BOTT, OF STAMFORD, CONNECTICUT, ASSIGNOR TO NORMA-HOFFMAN BEARINGS CORP., OF STAMFORD, CONNECTICUT, A CORPORATION OF NEW YORK

BEARING ASSEMBLY UNIT AND MOUNTING THEREFOR

Application filed December 29, 1927. Serial No. 243,301.

This invention relates to an improved bearing assembly unit and mounting therefor, and has for its general object and purpose to simplify the construction of the bearing unit and reduce the manufacturing cost thereof; to enable the bearing unit to be easily and quickly mounted with a minimum of preparatory machine work by the user, and to provide means whereby the movable bearing parts are thoroughly protected against accumulations of dirt or dust before or during the application of the bearing to its operative position and whereby the bearing unit may be grease packed by the manufacturer, thus eliminating the necessity of periodic lubrication during the use thereof.

More particularly, it is one of the important objects of the invention to provide a bearing assembly unit including inner and outer race rings between which the movable bearing members are arranged, and said outer ring being of relatively great width with respect to the inner ring and constituting a housing or casing for the movable bearing parts, together with end plates or closures assembled with the wall of said outer bearing ring and holding the enclosed bearing parts against axial displacement relative thereto.

It is also another object of my invention to provide one of said closures in the form of a flanged disc to be pressed into the bore of the outer bearing ring and held by a frictional coaction with the wall thereof and constructed to retain a body of grease between itself and the movable bearing parts.

It is also an additional object of my present improvements to provide such a bearing assembly unit adapted to be fitted into a recess or bore formed in a supporting member and to provide means arranged in said bore and coacting with the outer bearing ring to prevent rotative movement of the latter and thus obviate frictional wear upon the outer face thereof and the wall of the bore which would result in objectionable looseness and consequent vibration of the bearing unit and chattering metallic noise incident to contact of the same with the supporting member.

While the device forming the subject matter of this application is of more or less general use in connection with various mechanical apparatus, it is designed more particularly for use in connection with small motors such as are used in vacuum cleaners and to this end, it is an important consideration that the bearing assembly units for each end of the motor shaft are of identically the same construction so that no mistake can be made by the agent or demonstrator, in the application of said bearing units. Each of the units is provided with means whereby it may be readily fitted upon the shaft end by the direct application of pressure against the inner bearing ring without disassembling the parts of the unit. After the two units have thus been applied to the ends of the motor shaft, they may then be readily mounted or fitted within the recesses or bores which have been formed in one end of the motor housing or casing and in a separate end wall or cover plate therefor.

With the above and other objects in view, the invention consists in the improved bearing assembly unit and mounting therefor, as will be hereinafter more fully described, illustrated in the accompanying drawing, and subsequently incorporated in the subjoined claims.

In the drawing, wherein I have disclosed several simple and practical embodiments of my present improvements, and in which similar reference characters designate corresponding parts throughout the several views,—

Figure 1 is a fragmentary sectional view through a motor housing or casing showing the bearing assembly units as fitted upon the opposite ends of the motor shaft and mounted in operative position;

Fig. 2 is an end elevation of the outer bearing ring;

Fig. 3 is a detail plan view of the holding or locking device for the outer bearing ring at one end of the shaft;

Fig. 4 is a similar view of another form of locking device for the outer bearing ring at the opposite end of the shaft;

Fig. 5 is an enlarged sectional view of the bearing assembly unit showing the same as used without a ball holding cage;

Fig. 6 is a similar view showing a slightly modified form of the side plates or closures and the means for retaining the same in assembled relation with the outer bearing ring, and Fig. 7 is a sectional view similar to Figs. 5 and 6 showing the outer ring of the bearing externally provided with a sleeve of paper, fiber or similar sound deadening material.

Referring in detail to the drawing, and more particularly to Fig. 1 thereof, 5 designates the motor housing or casing which may be of more or less conventional form, as commonly seen for instance, in the use of small motors in connection with vacuum cleaners and similar apparatus. A closure or cover plate 6 is provided for one end of this motor housing, any approved means being provided to retain said plate in its applied position. 7 designates the armature adapted to be operatively arranged and supported within the housing 5, 8 the shaft thereof having the usual commutator 9 at one of its ends and the fan 10 at its opposite end. For the purpose of receiving the bearing assembly units to be hereinafter described in detail, and by which the opposite ends of the motor shaft are directly supported, the user provides the wall of the housing or casing 5 at its closed end with an internally opening bore or recess 11. The cover plate 6 for the open end of the housing is formed upon its inner face with a cylindrical boss or projection which is likewise provided with a similar bore or recess 12.

For the purpose of expediting assemblage of the parts, the bearing manufacturer is required to supply the bearings for such motors in the form of self contained units which may be directly pressed upon the ends of the motor shaft so that it only remains for the manufacturer of the vacuum cleaner or other apparatus to provide the receiving bores or recesses 11 and 12 in which the bearing units can be easily fitted. It is likewise required that such bearings shall be substantially noiseless in operation, shall be free from the necessity of more or less frequent lubrication and that the cost thereof shall be comparatively low so as not to increase the selling price of the apparatus equipped therewith.

To the above end, I provide a self contained grease packed anti-friction bearing unit consisting of an inner race ring 13 and an outer race ring 14, said inner and outer race rings being provided in their opposing faces with the usual raceways to receive the balls or other anti-friction bearing elements indicated at 15. It will be noted that the outer ring 14 is of comparatively great width with respect to the inner ring 13 and projects beyond the opposite side edges of the latter so that this outer ring subserves the purpose of a casing or housing for the movable elements of the bearing. If desired, as shown in Fig. 1 of the drawings, I may provide a cage 16 for the bearing balls to hold the same in spaced relation to each other, or, this cage may be omitted, as shown in Fig. 5 of the drawings.

The outer bearing ring 14 at one of its ends and at the inner face thereof is formed with an under cut annular shoulder 17 which is adapted to be engaged by the beveled edge of a side plate 18 of resilient sheet metal, such as brass. The normal maximum diameter of this plate is slightly less than the inner diameter of the shoulder 17 so that the plate may be readily positioned at its edge against the base of said shoulder. By means of a suitable tool engaged against the outer face of the plate contiguous to its edge and the application of pressure, the marginal edge portion of the plate is swaged outwardly into tight frictional engagement with the undercut face of said shoulder 17, thus securely locking said plate in connection with the outer bearing ring. This side plate 18 is of annular form and is provided at its inner edge with an inwardly extending flange 19, the end of which is positioned closely contiguous to one side edge of the inner bearing ring 13.

The opposite side of the housing formed by the outer bearing 14 is closed by the side plate 20 which is also of annular form and has an inner diameter substantially the same as the inner diameter of the sleeve or flange 19 on the plate 18. Concentrically spaced inner and outer flanges 21 and 22 respectively, project from the inner side of the plate 20, said outer flange being of greater width than the inner flange and having its outer face accurately finished and adapted to be pressed in one end of the outer bearing ring 14 to frictionally coact with the inner surface of said ring and thus hold the plate 20 against turning movement. The outer edge portion of the plate 20 projects beyond the outer face of the flange 22 as indicated at 23 and forms a stop shoulder abutting against the edge face of the ring 14. Thus the inner ring 13 with the bearing balls are loosely positioned and held between the inwardly extending flanges of the side plates 18 and 20. It will be noted that the internal diameter of the flanges 19 and 21 on these plates is appreciably greater than the internal diameter of the inner bearing ring 13 so that a part of this ring extends inwardly from said flanges.

The annular space between the flanges 21 and 22 of the side plate 20 forms a pocket 24 of appreciable volume, and the bearing manufacturer in assembling the parts, packs this pocket with a suitable lubricating grease so that in the operation of the bearing and in the movement of the inner ring 13 and the bearing elements 15, said movable parts will be automatically and continuously lubricated. Also the side plate 18 having the inwardly extending flange 19 provides a similar pocket, which is likewise preferably filled with grease when the parts are assembled. By the provision of such a grease packed bearing assembly unit having the side plates or closures 18 and 20, it will be evident that the movable bearing parts are thoroughly protected both while carried in stock by the bearing manufacturer, and after application to applied position by the user in connection with the motor shaft, against entrance of grit, dust and dirt, which would tend to produce frictional resistance resulting in excessive wear.

In order to obviate the necessity of great accuracy by the user of such assembled bearing units in the formation of the bores or recesses 11 and 12 in the housing or casing parts and at the same time prevent rotational movement or creeping of the outer bearing ring which will result in a loosening thereof and chattering against the wall of the bore, I provide the locking or holding devices for the outer bearing rings as shown in Figs. 3 and 4 of the drawings. These devices may be produced in the form of simple sheet metal stampings which act automatically in the initial operation of the armature shaft to securely lock and hold the outer bearing rings in fixed relation to said shaft and the housing parts upon which they are supported.

At the fan end of the shaft, I provide the locking device illustrated in Fig. 3 of the drawings which consists of a stamped plate 25 of resilient sheet metal having a central shaft receiving opening and an annular laterally deflected or bowed portion 26 adjacent to said opening. The outer edge of this plate is recessed or cut away at spaced intervals and the intervening parts thereof are provided with the tapering lugs or fingers 27 projecting at approximately right angles to the plane of the plate. The end face of the bearing ring 14 is provided with a plurality of equi-distantly spaced radially disposed notches or grooves 28 adapted to receive the ends of the respective lugs or fingers 27.

At the commutator end of the motor shaft, a somewhat different form of locking member is employed. As shown in Fig. 4 of the drawings, this member consists of a spider shaped plate 29 of resilient sheet metal having a plurality of radially extending arms. Alternate arms 30 have their intermediate portions laterally bent or bowed and terminate in the angularly projecting rectangular lugs 31. The remaining arms 32 also have their intermediate portions bent or bowed to a somewhat greater extent than the arms 30 and terminate in the laterally projecting tapering lugs 33. As will be noted from reference to Fig. 4, the lugs 31 of the arms 30 are located outwardly of the plane of the lugs 33, and as will be observed from reference to Fig. 1 of the drawings, the lugs 33 project laterally with respect to the plane of the central part of the member 29 beyond the end edges of the lugs 31. These tapering lugs 33 are adapted to resiliently bear against the end face of the bearing ring 14 and to engage in the grooves or channels 28 thereof and act to adjust the outer bearing ring with respect to the wall of the bore in which it is mounted and also to prevent turning movement of said ring while the lugs 31 are adapted to frictionally bind against the wall of the bore and prevent turning movement of the locking member.

In Fig. 5 of the drawings, I have shown a bearing assembly unit substantially identical to that above described with the exception that the holding cage 16 for the antifriction balls 15 is omitted.

In the use of the invention as above described, it will be understood that the bearing is supplied by the bearing manufacturer in the form of a completely assembled unit, packed with grease and ready for mounting. At the commutator end of the armature shaft, said shaft is formed with the annular shoulder 9' and the fan 10 is secured upon the other end of said shaft against a similar shoulder by means of the collar indicated at 10', the external diameter of said collar and the diameter of the shoulder 9' being slightly less than the diameter of the central opening of the side plates 20 of the bearing assembly unit.

Assuming that the wall of the motor housing and the closure plate 6 have been provided with the bores 11 and 12, the user fits one of the bearing assembly units upon each end of the motor shaft. This may be readily done by simply inserting a tubular implement through the opening in the side plate 18 and pressing inwardly against the inner bearing ring 16, thus forcing said ring and the entire assembly unit inwardly along the motor shaft until the inner bearing ring at one end of the shaft abuts against the shoulder 9' and the ring of the other bearing assembly unit on the other end of the shaft abuts against the collar 10'. When so positioned, the side plates 20 of the bearing assembly units are in clearance relation respectively to the periphery of the enlarged part of the armature shaft and the periphery of the collar 10' while the inner ring of the bearing and the rotatable bearing elements 15 are out of contact with the flanges of the side plates 20. The locking member 29 is then placed within the bore 11 of the wall of the motor housing 5, the lugs 31 frictionally engaging the wall thereof, and the bearing assembly unit on the commutator end of the armature shaft is inserted into said bore. The pressure of the outer bearing ring on the angular lugs 33 of the arms 32 tends to radially extend or expand the arms of the member 29, the other arms 30 bearing against the base wall of the bore 11 and urging the angular lugs 31 on the outer ends thereof into tight frictional contact against the cylindrical wall of said bore.

The cover plate 6 for the motor housing is then placed in position, after the locking member 25 has been inserted in the bore thereof, and the bearing assembly unit on the fan end of the motor shaft is received in said bore. The locking member 25 is also held against rotation by the frictional gripping contact of the lugs 27 thereof against the wall of the bore 12. In order for the bearing assembly units to readily enter the bores 11 and 12, a fair tolerance must be allowed in the diameters of said bores relative to the diameter of the outer bearing ring 14. This would ordinarily result, in the operation of the motor, in a rotational creeping motion of the outer bearing rings which would produce wear and result in a loose mounting of the bearing assembly unit causing an objectionable metallic noise. This is particularly the case where the motor housing is formed from aluminum, as is usually the case in motors of this type. However, by means of my invention, this objectionable creeping movement of the outer bearing rings is prevented, since in the initial operation of the motor, the outer bearing rings will turn only until the notches 28 in the outer side edges thereof come into registration with the lugs 27 and 33 of the locking members 25 and 29 respectively. These lugs will then resiliently snap into said notches or grooves and thus securely lock the outer bearing rings against any further rotational movement relative to the walls of the bores 11 and 12. It will thus be seen that I have provided not only a novel form and construction of the bearing assembly unit, but an improved mounting therefor which enables said bearing to quietly operate at very high speeds with maximum efficiency. By providing the bearing units with the outer rings 14 substantially double the width of the ordinary standard bearing, the area of contact between this ring and the wall of the supporting part in which the unit is mounted is also practically doubled, thus decreasing the intensity of pressure between the parts, resulting in a material decrease in wear, in the event that the bearing unit should ever be used without the resilient locking devices shown in Figs. 3 and 4 of the drawings.

If additional assurance against the development of noise in the bearings is desired, felt washers are heretofore used may be interposed between the locking devices 25 and 29 and the side plates of the bearing assembly units. If these washers are used, they should be impregnated with a lubricant, and will materially aid in dampening noise producing vibrations.

From the foregoing description considered in connection with the accompanying drawings, the construction, manner of application and use of the several advantages of my improved bearing assembly unit and the mounting therefor will be clearly understood. It will be noted that the two assembly units to be fitted on the shaft ends are of identically the same construction so that it is only necessary to carry one type of bearing assembly unit in stock, and mistakes cannot be made by agents or workmen in fitting the bearings to the motor shaft. Also, in view of the extremely simple construction of the new bearing assembly unit, the same may be manufactured and sold at comparatively small cost so that such grease packed bearing units may be supplied to manufacturers of vacuum cleaners and other similar apparatus for application thereto without necessitating an increase in the selling price of such apparatus.

In Fig. 6 of the drawings, I have shown an alternative embodiment of the bearing assembly unit, in which each of the side plates 35 is in the form of a sheet metal stamping having a central opening surrounded by the laterally projecting flange 36 which is of less diameter than the outer diameter of the inner bearing ring. Each of the plates 35 at its outer edge is also formed with an annular flange 37 preferably of concave-convex shape in cross section so that it may be readily snapped or pressed into the annular grooves 38 formed in the outer face of the bearing ring 14' at the opposite side edges thereof. In this case, a metal ring 39 is fitted into the bore of the bearing ring 14' at one side thereof to retain the bearing balls in position in the raceway of said ring, and the space between the bearing balls, the ring 39 and the flange 36 of the side plate forms a grease holding pocket 40 similar to the pocket 24 in the construction above described.

As a further assurance against the generation of noise in the operation of the bearing, I may provide a sleeve of paper or fiber composition material surrounding the outer bearing ring as indicated at 42 in Fig. 7 of the drawings. In case such a sound deadening or insulating sleeve is used, the flange 23 of the side plate 20 is made of greater width than is seen in Fig. 5 of the drawings, so that it will project beyond the outer face of the bearing ring 14 and provide an abutment with which one end edge of the sleeve 42 is engaged so that in the insertion of the assembled bearing unit to its operative position within the bore of the housing, said sound insulating sleeve will not shift longitudinally relative to the bearing ring. By the use of such an insulating sleeve, it is apparent that there is no possibility of contact between the outer ring of the bearing and the housing wall so that should any movement of this outer bearing ring take place, the production of noise incident thereto is precluded.

By the provision of a completely assembled anti-friction bearing unit of the character above described, the bearing manufacturer is enabled to supply to the user such anti-friction bearings for high speed operation provided with a generous quantity of lubricant, and at a very low cost. I have herein referred to the device as being particularly designed and adapted for use in connection with such small motors as are used in vacuum cleaners and the like. However, it will of course, be apparent that the bearing units may be produced in various sizes, and in view of the relatively wide outer bearing ring, such units may be advantageously used in the larger sizes in connection with various other machines, and particularly in cases where the bearing is mounted in the wall of an aluminum housing or casing. Heretofore it has been found necessary to provide the bores of such aluminum housing walls with bushings of steel or brass in order to prevent wear due to the rotative creeping motion of the outer bearing ring. In the use of my new bearing unit in the larger sizes for such applications, it becomes unnecessary to provide such bushings, in view of the extra wide outer bearing ring which will have a maximum area of direct frictional contact with the wall of the bore.

While I have above described several simple and practical embodiments of my present improvements, it will nevertheless be understood that the essential features thereof are susceptible of embodiment in various other alternative structures, and I therefore, reserve the privilege of resorting to all such legitimate changes in the form, construction and relative arrangement of the several parts as may be fairly embodied within the spirit and scope of the invention as claimed.

I claim:

1. In combination with a supporting wall having a bore, an anti-friction bearing unit including inner and outer one-piece rings and a plurality of rotatable bearing elements arranged therebetween, annular closure plates for the opposite sides of the bearing unit connected with said outer bearing ring, and a plate arranged within said bore having a plurality of resiliently yieldable lugs directly bearing against one side edge of the outer ring and adapted to coact with means on said ring to lock the bearing ring against rotative creeping movement.

2. The combination with a supporting wall having a bore, an anti-friction bearing unit including rotatable bearing elements and a bearing ring having an internal race for said bearing elements, a plate arranged within said bore at one end thereof having a plurality of spaced arms frictionally bearing at their outer ends against the wall of the bore to hold said plate against rotation, said bearing unit adapted for insertion in said bore and said plate having additional resiliently yieldable arms provided with means directly engaging one end of the bearing ring to adjustably position the same in said bore and hold said bearing ring against rotative movement relative to the wall of the bore.

3. An anti-friction bearing unit comprising inner and outer bearing rings provided in their opposed circumferential faces with races to receive anti-friction bearing elements, the bearing race in the outer ring being open at one of its lateral sides, bearing elements engaged in said races; and an annular lubricant retaining and dust excluding plate closing the space between the inner and outer bearing rings at one side thereof and having a cylindrical flange projecting from one side thereof adjacent its outer edge and extending longitudinally in frictional contact with the inner face of the outer bearing ring and projecting inwardly therefrom at the open side of the race in said bearing ring and adjacent to the bearing elements to close the open side of the race and prevent axial shifting movement of the outer ring and the bearing elements relative to each other.

4. An anti-friction bearing unit comprising inner and outer bearing rings having races in their opposed faces to receive anti-friction bearing elements, the race in the outer ring being open at one of its lateral sides and said ring from the open side of the race to one end edge of the ring being counterbored, anti-friction elements engaged in said races; a lubricant retaining and dust excluding plate fixed at its outer edge to the outer bearing ring and terminating at its inner edge in clearance relation to the inner bearing ring and a part extending axially and inwardly from the inner face of said plate frictionally engaged with the face of the counterbore in the outer bearing ring and closing the open side of the race therein to prevent axial shifting movement of said bearing ring and the anti-friction bearing elements relative to each other.

In testimony that I claim the foregoing as my invention, I have signed my name hereto.

GEORGE R. BOTT.